(12) United States Patent
Zhu et al.

(10) Patent No.: US 9,471,597 B2
(45) Date of Patent: Oct. 18, 2016

(54) THREE-DIMENSIONAL ANNOTATIONS FOR STREET VIEW DATA

(71) Applicant: Google Inc., Mountain View, CA (US)

(72) Inventors: Jiajun Zhu, Sunnyvale, CA (US); Daniel Joseph Filip, San Jose, CA (US); Luc Vincent, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 239 days.

(21) Appl. No.: 14/230,840

(22) Filed: Mar. 31, 2014

(65) Prior Publication Data

US 2014/0210817 A1 Jul. 31, 2014

Related U.S. Application Data

(63) Continuation of application No. 13/282,880, filed on Oct. 27, 2011, now Pat. No. 8,717,354, which is a continuation of application No. 12/014,513, filed on Jan. 15, 2008, now Pat. No. 8,072,448.

(51) Int. Cl.
| | |
|---|---|
| *G06T 15/00* | (2011.01) |
| *G06T 15/02* | (2011.01) |
| *G06T 17/00* | (2006.01) |
| *G06T 19/00* | (2011.01) |
| *G06F 17/30* | (2006.01) |

(52) U.S. Cl.
CPC ......... *G06F 17/30241* (2013.01); *G06T 19/00* (2013.01); *G06T 2219/004* (2013.01)

(58) Field of Classification Search
None
See application file for complete search history.

(56) References Cited

U.S. PATENT DOCUMENTS

| 6,842,175 B1 | 1/2005 | Schmalstieg et al. |
| 7,096,428 B2 | 8/2006 | Foote et al. |

(Continued)

FOREIGN PATENT DOCUMENTS

| EP | 1122692 A2 | 8/2001 |
| EP | 1197923 A2 | 4/2002 |

(Continued)

OTHER PUBLICATIONS

Christian Frueh and Avideh Zakhor, "Constructing 3D City Models by Merging Ground-Based and Airborne Views", Proceedings of the 2003 IEEE Computer Society Conference on Computer Vision and Pattern Recognition (CVPR'03), pp. 52-61, http://ieeexplore.ieee.org/xpls/abs_all.jsp?arnumber=1242382&tag=1.*

(Continued)

*Primary Examiner* — Tize Ma
(74) *Attorney, Agent, or Firm* — Lerner, David, Littenberg, Krumholz & Mentlik, LLP

(57) ABSTRACT

The present invention relates to annotating images. In an embodiment, the present invention enables users to create annotations corresponding to three-dimensional objects while viewing two-dimensional images. In one embodiment, this is achieved by projecting a selecting object onto a three-dimensional model created from a plurality of two-dimensional images. The selecting object is input by a user while viewing a first image corresponding to a portion of the three-dimensional model. A location corresponding to the projection on the three-dimensional model is determined, and content entered by the user while viewing the first image is associated with the location. The content is stored together with the location information to form an annotation. The annotation can be retrieved and displayed together with other images corresponding to the location.

16 Claims, 12 Drawing Sheets

(56) References Cited

U.S. PATENT DOCUMENTS

| | | | |
|---|---|---|---|
| 7,158,878 B2 | 1/2007 | Rasmussen et al. | |
| 7,161,604 B2 | 1/2007 | Higgins et al. | |
| 8,072,448 B2 | 12/2011 | Zhu et al. | |
| 8,525,825 B2* | 9/2013 | Zhu | G06T 15/06 345/419 |
| 8,717,354 B2* | 5/2014 | Zhu | G06F 17/30241 340/995.1 |
| 2005/0179703 A1 | 8/2005 | Johnson | |
| 2005/0190962 A1 | 9/2005 | Liu et al. | |
| 2006/0241860 A1 | 10/2006 | Kimchi et al. | |
| 2007/0282792 A1* | 12/2007 | Bailly | G06F 17/30241 |
| 2009/0010507 A1* | 1/2009 | Geng | G06T 7/0075 382/128 |

FOREIGN PATENT DOCUMENTS

| | | | |
|---|---|---|---|
| JP | 2002216163 A | 8/2002 | |
| JP | 2003287434 A | 10/2003 | |
| JP | 2007316839 A | 12/2007 | |
| WO | 0148700 A1 | 7/2001 | |

OTHER PUBLICATIONS

Caroline Baillard et al, "Automatic line matching and 3D reconstruction of buildings from multiple views", ISPRS Conference on Automatic Extraction of GIS Objects from Digital Imagery, Sep. 1999, Munich, Germany. 32, Part 3-2W5, pp. 69-80, 1999, https://hal.inria.fr/inria-00590111/.*

Japanese Office Action for Application No. 2013-174506 dated Apr. 22, 2014.

Amato et al, "Region proximity in metric spaces and its use for approximate similarity search", ACM Transactions on Information Systems(TOIS), vol. 21 Issue 2, Apr. 2003 ACM New York, NY, pp. 192-227.

Kimber, et al.; "FlyAbout: Spatially Indexed Panoramic Video," Proceedings of the ninth ACM international conference on Multimedia ; 2001; pp. 339-347.

Lowe, et al.; "Fitting Parameterized Three-Dimensional Models to Images," IEEE Transactions on Pattern Analysis and Machine Intelligence, 13, 5, May 1991; pp. 441-450.

Zhu, U.S. Appl. No. 12/038,325, filed Feb. 27, 2008, entitled "Using Image Content to Facilitate Navigation in Panoramic Image Data".

Microsoft Corp. "Windows Live Local—Virtual Earth Technology Preview"; 2005. Downloaded from http://preview.local.live.com/ on Oct. 26, 2007. 1 page.

Pegoraro, Rob. "Mapping That Puts You There"; The Washington Post; May 31, 2007; p. D1. 2 pages.

Bay et al., "SURF: Speeded Up Robust Features;" Computer Vision—European Conference on Computer Vision 2006; Jul. 26, 2006; pp. 1-14.

Bay et al., "SURF: Speeded Up Robust Features," Computer Vision—ECCV 2006 Lecture Notes in Computer Science, LNC, Springer, Berlin, DE, vol. 3951, Jan. 1, 2006, pp. 404-417.

Liu et al., "An Investigation of Practical Approximate Nearest Neighbor Algorithms," Proc. of NIPS 2004, Dec. 13, 2004, pp. 1-8.

PCT Report mailed Jun. 15, 2009, International Appln. No. PCT/US2009/000240, Filed Jan. 15, 2009; issued by the European Patent Office, 15 pages.

First Office Action for Chinese National Phase Application No. 200980102322.4, Date of Issuing: Nov. 2, 2011, 7 pages.

John Yannis Goulermas and Panos Liatsis, "A Collective-Based Adaptive Symbiotic Model for Surface Reconstruction in Area-Based Stereo", IEEE Transactions on Evolutionary Computation, vol. 7, No. 5, Oct. 2003, pp. 482-502.

* cited by examiner ature, structure, or
THREE-DIMENSIONAL ANNOTATIONS FOR STREET VIEW DATA

CROSS REFERENCE TO RELATED APPLICATIONS

This application is a continuation of U.S. patent application Ser. No. 13/282,880, filed Oct. 27, 2011, which is a continuation of U.S. patent application Ser. No. 12/014,513, filed Jan. 15, 2008, the entire disclosures of which are incorporated by reference herein.

FIELD OF THE INVENTION

The present invention relates to annotating images.

BACKGROUND OF THE INVENTION

Computer systems exist that store and display images. These images can include photographs of three-dimensional objects such as buildings. The displayed images may be geo-coded to correspond to locations on a map. In addition, annotations may be used to provide information about the images. As an example, an annotation might include text that identifies a business associated with a particular building shown in an image.

What are needed are new methods and systems that facilitate the creation of annotations for images.

BRIEF SUMMARY

The present invention relates to annotating images. In an embodiment, the present invention enables users to create annotations corresponding to three-dimensional objects while viewing two-dimensional images. In one embodiment, this is achieved by projecting a selecting object (such as, for example, a bounding box) onto a three-dimensional model created from a plurality of two-dimensional images. The selecting object is input by a user while viewing a first image corresponding to a portion of the three-dimensional model. A location corresponding to the projection on the three-dimensional model is determined, and content entered by the user while viewing the first image is associated with the location. The content is stored together with the location information to form an annotation. The annotation can be retrieved and displayed together with other images corresponding to the location.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 4:
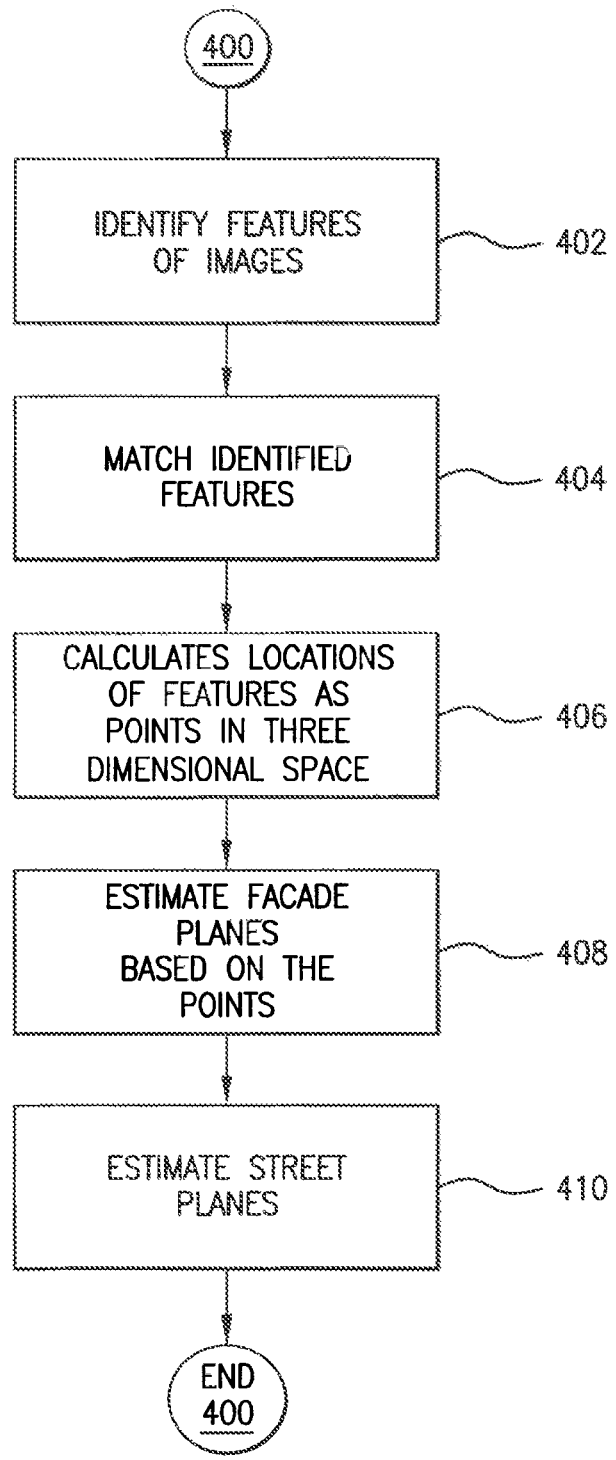
FIG. 4 is a flowchart that illustrates a method for creating a three-dimensional model from image data according to an embodiment of the present invention.
Figure 5A:
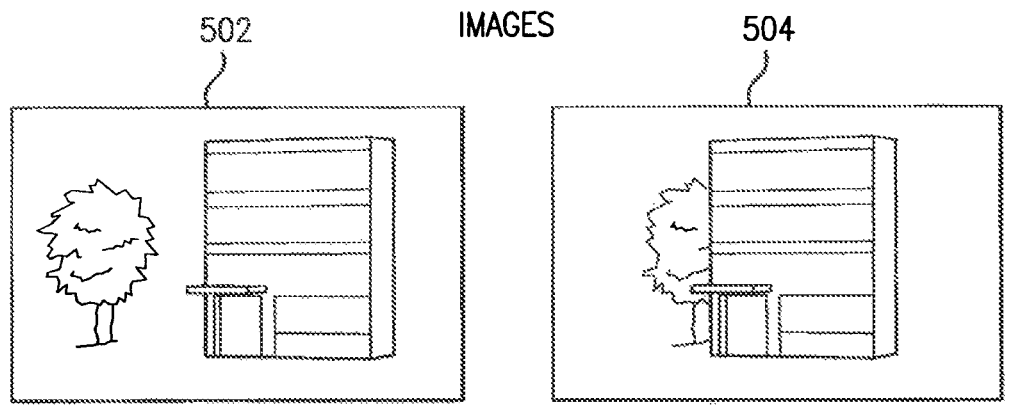
Figure 5B:
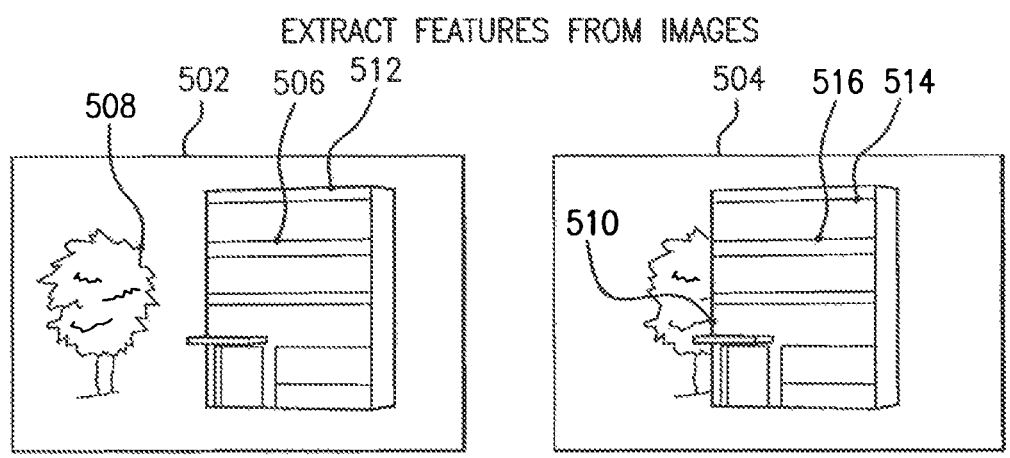
Figure 5C:
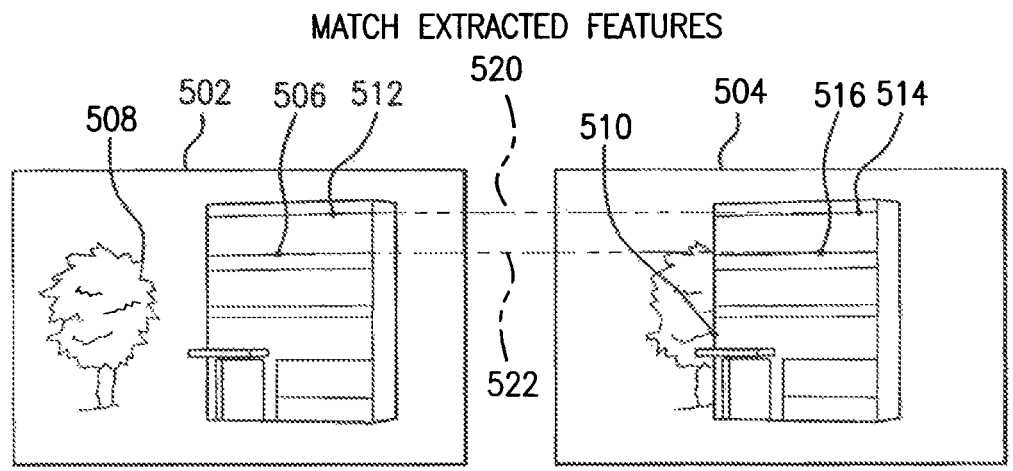

FIGS. 5A-C are diagrams that illustrate finding matching features according to the method of FIG. 4.

Figure 6:
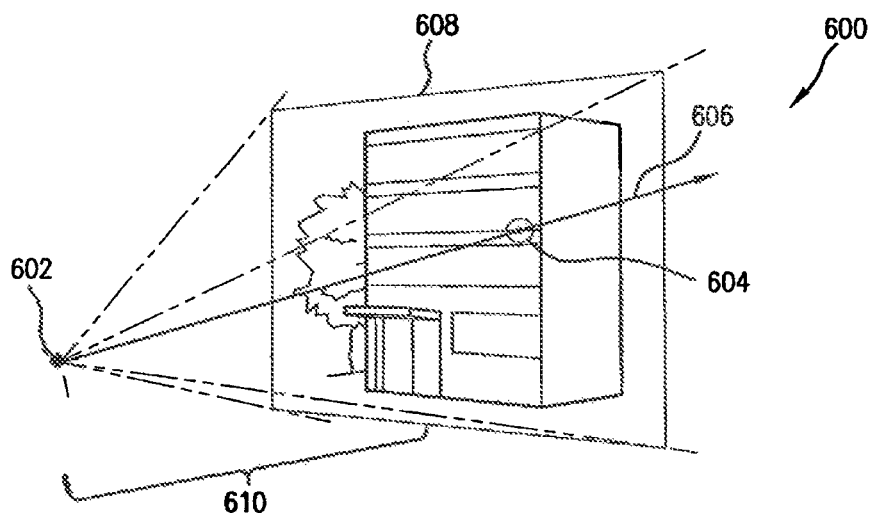
Figure 7:
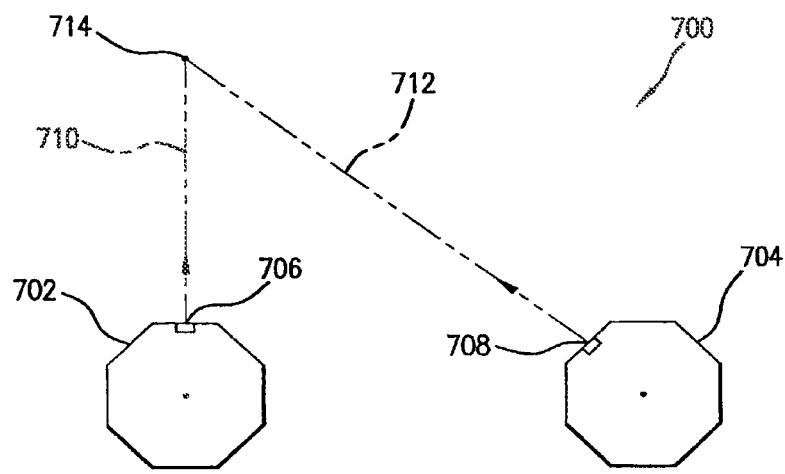

FIGS. 6-7 are diagrams that illustrate determining a point based on a pair of matching features according to the method in FIG. 4.

Figure 8A:
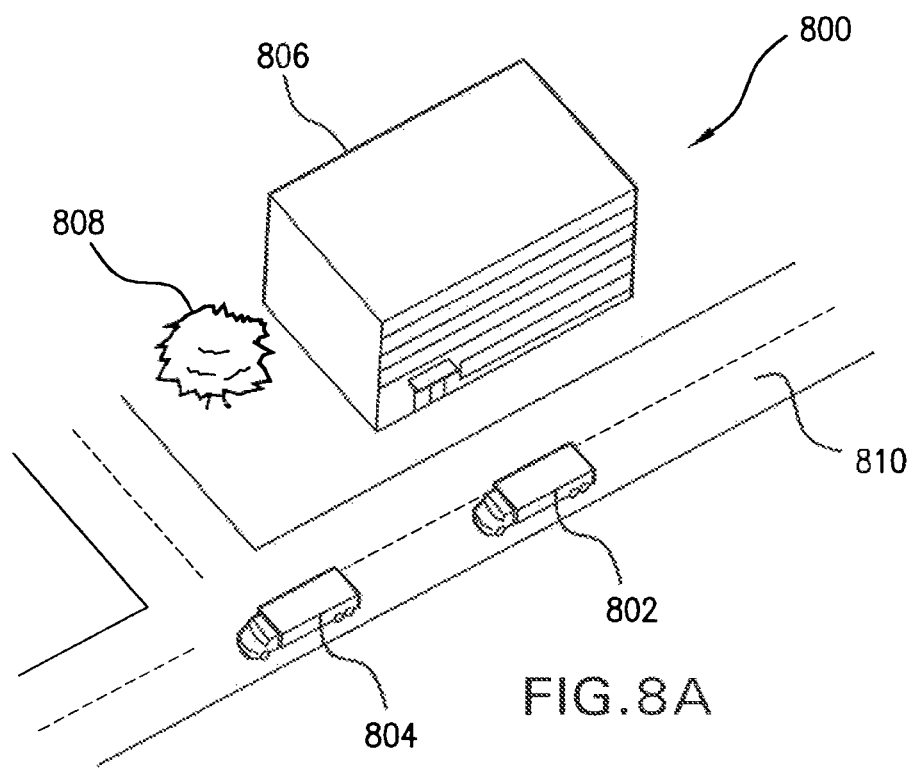
Figure 8B:
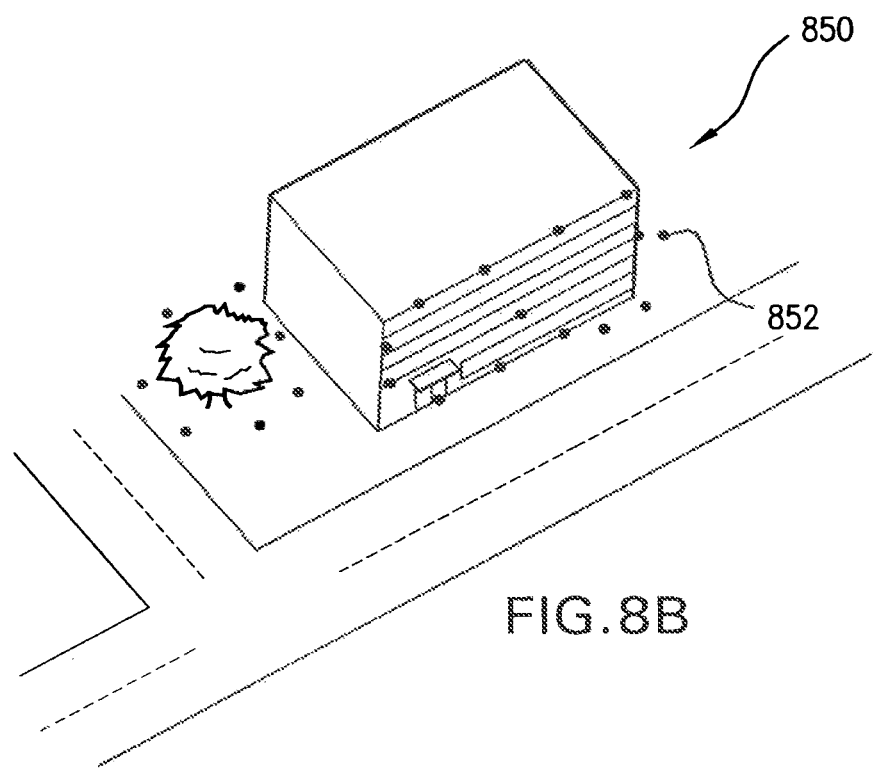

FIGS. 8A-B are diagrams that illustrate a plurality of points determined according to the method of FIG. 4.

Figure 9A:
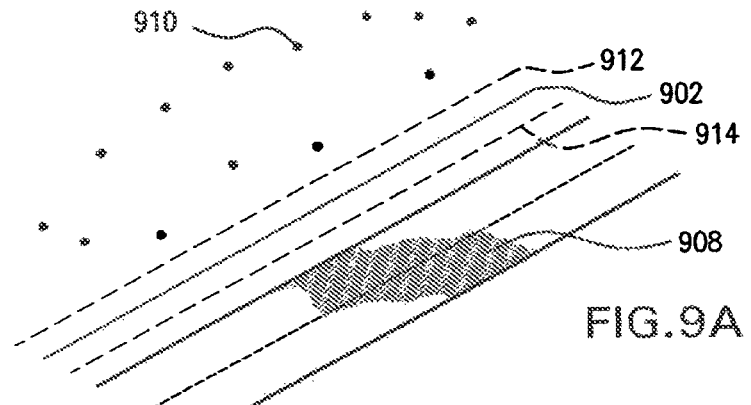
Figure 9B:
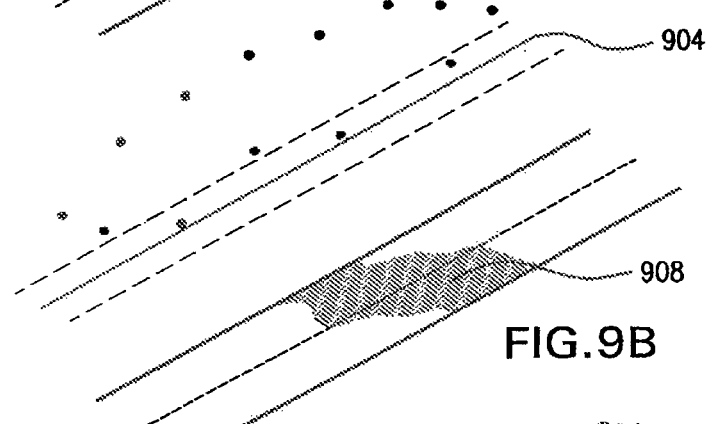
Figure 9C:
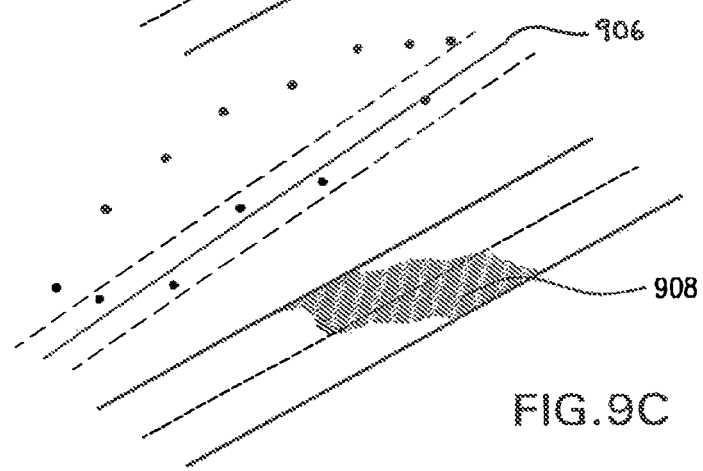

FIGS. 9A-C are diagrams that illustrate determining a surface based on a plurality of points according to the method of FIG. 4.

Figure 10:
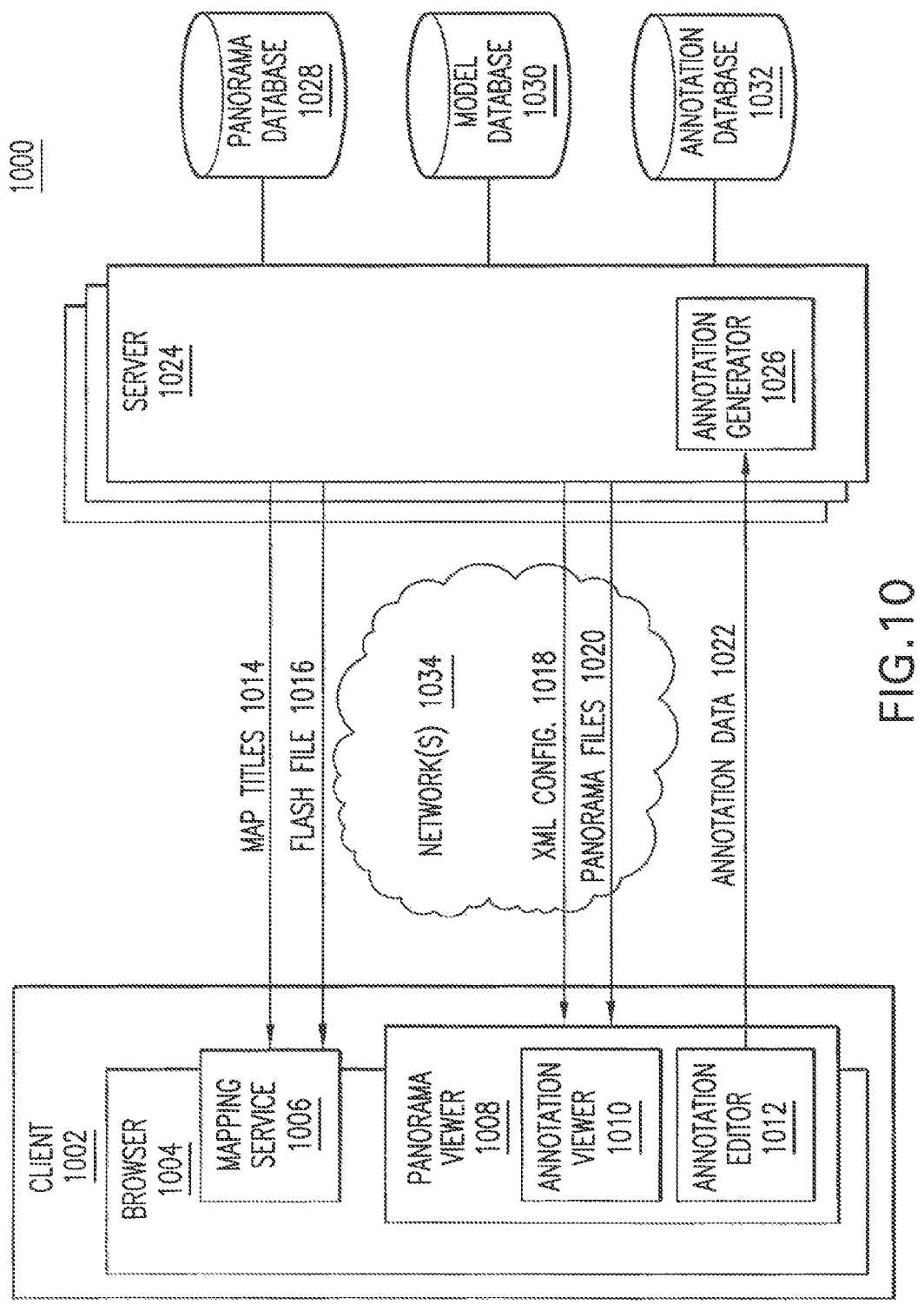

FIG. 10 is a diagram that illustrates a system for creating and displaying annotations according to an embodiment of the present invention.

Figure 11:
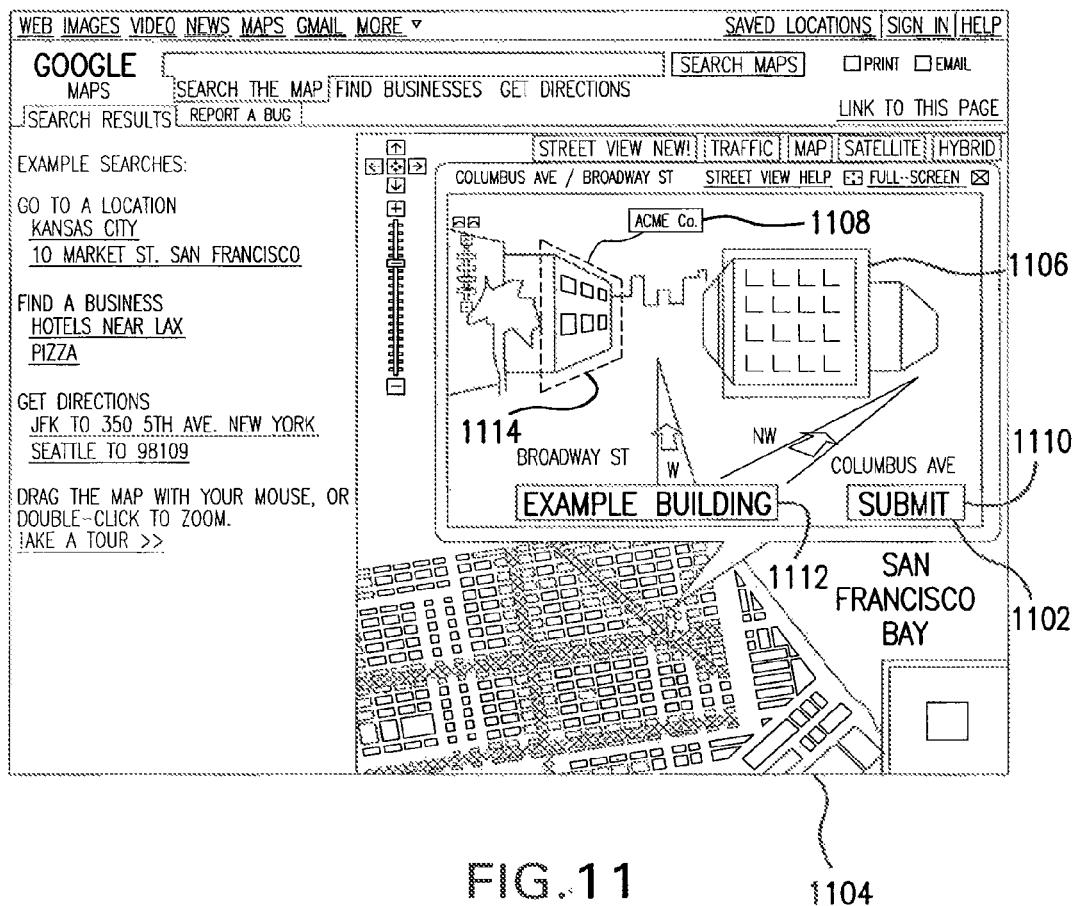

FIG. 11 is a diagram that illustrates an example browser interface for the system of FIG. 10.

Figure 12:
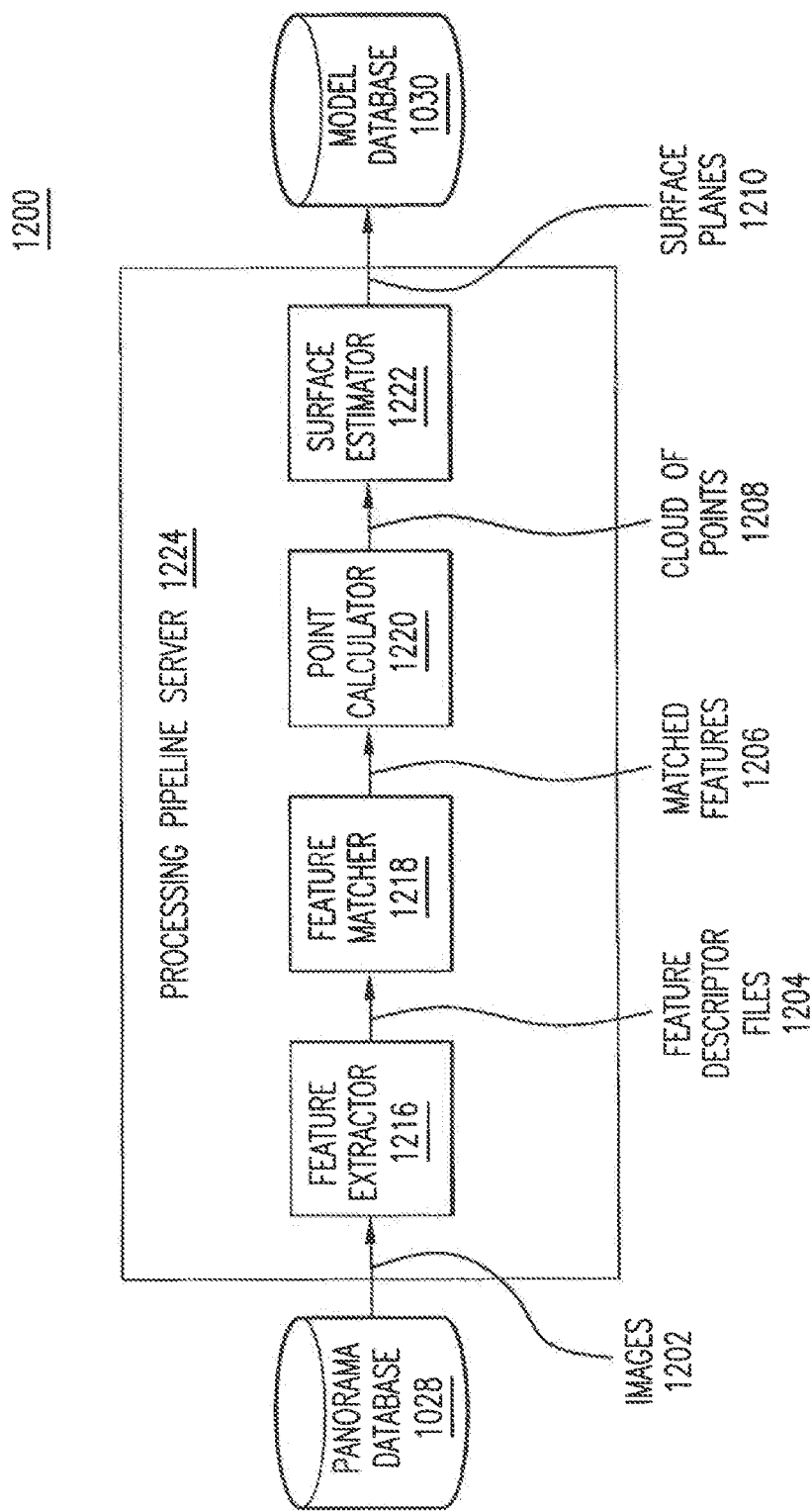

FIG. 12 is a diagram that illustrates a system for creating a three-dimensional model from image data according to an embodiment of the present invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

The present invention relates to annotating images. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In an embodiment, as described herein, the present invention enables users to create annotations corresponding to three-dimensional objects while viewing two-dimensional images. In one embodiment, this is achieved by projecting a selecting object onto a three-dimensional model created from a plurality of two-dimensional images. The selecting object is input by a user while viewing a first image corresponding to a portion of the three-dimensional model. A location corresponding to the projection on the three-dimensional model is determined, and content entered by the user while viewing the first image is associated with the location. The content is stored together with the location information to form an annotation. The annotation can be retrieved and displayed together with other images corresponding to the location.

Figure 1:
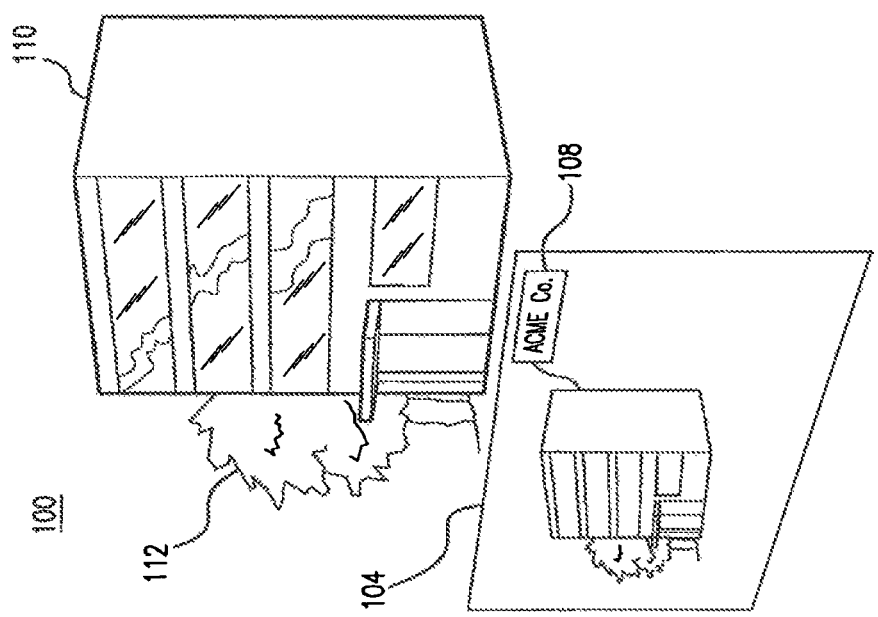
FIG. 1 is a diagram that illustrates an example annotation according to an embodiment of the present invention.
Figure 1:
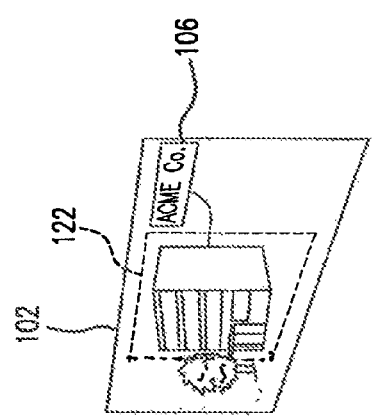

FIG. 1 is a diagram that illustrates an example 100 for creating annotations according to an embodiment of the present invention. Example 100 involves a tree 112 and a building 110 in three-dimensional space. Example 100 also involves an image 102 and an image 104 taken of tree 112 and building 110 from different perspectives. Each of image 102 and image 104 are two-dimensional images. In an embodiment, image 102 and image 104 may be photographic images taken from different points on a street.

As shown in example 100, a user may input a selecting object 122 (e.g., a bounding box) and text 106 while viewing image 102. Selecting object 122 contains a portion of image 102 showing building 110. As described in more detail below, embodiments of the invention determine a location corresponding to selecting object 122. In the example shown, the location determined for selecting object 122 is the location corresponding to building 110. Text 106 is stored together with the location determined for selecting object 122 (e.g., the location of building 110) to form an annotation according to the present invention. The stored annotation may be retrieved and displayed, for example, together with another image (e.g., image 104) or a map. In FIG. 1, the annotation is shown displayed on top of image 104 at location 108.

Figure 2A:
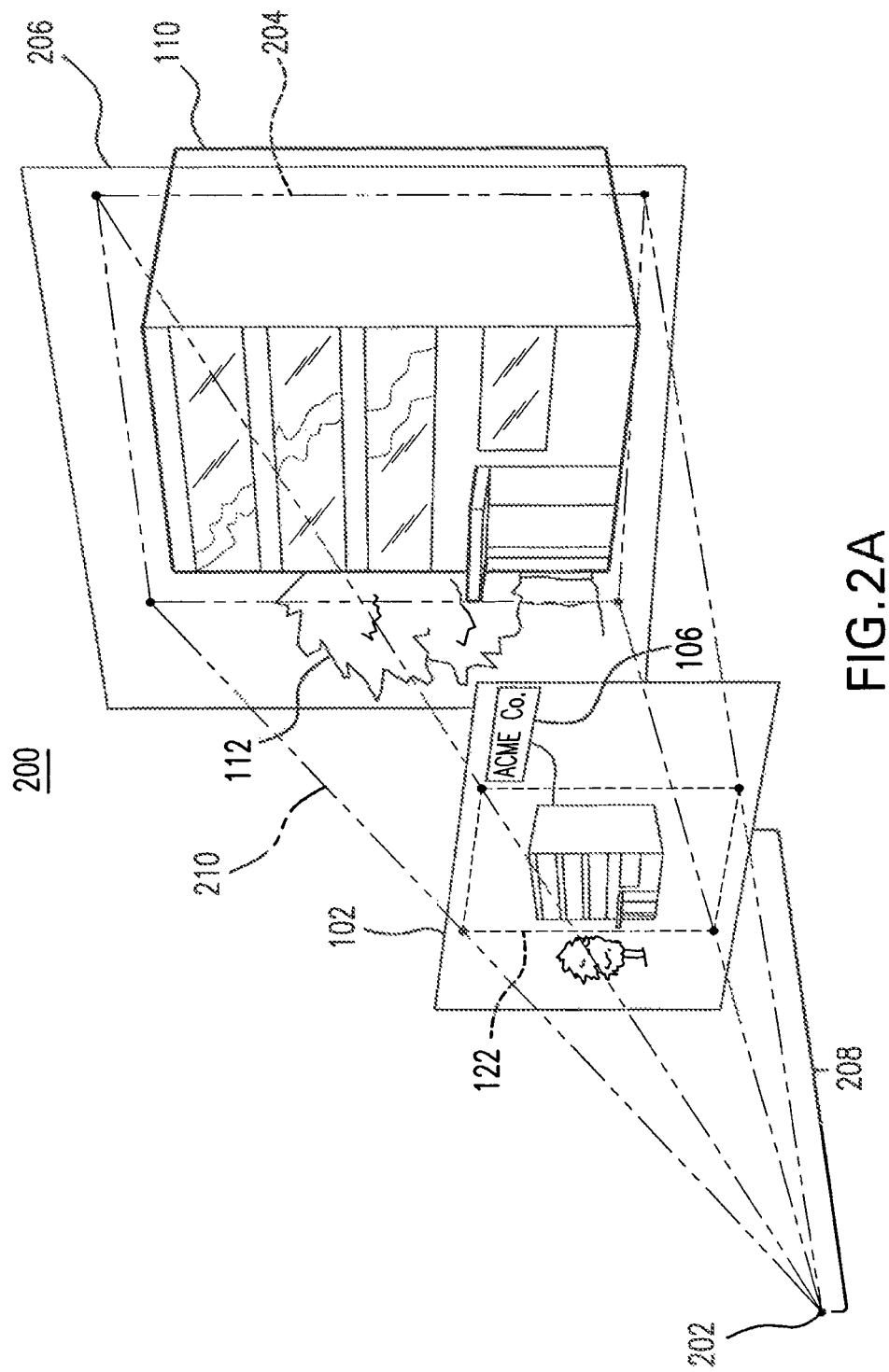
FIG. 2A is a diagram that illustrates using an image to determine a location of an annotation according to an embodiment of the present invention.
Figure 2B:
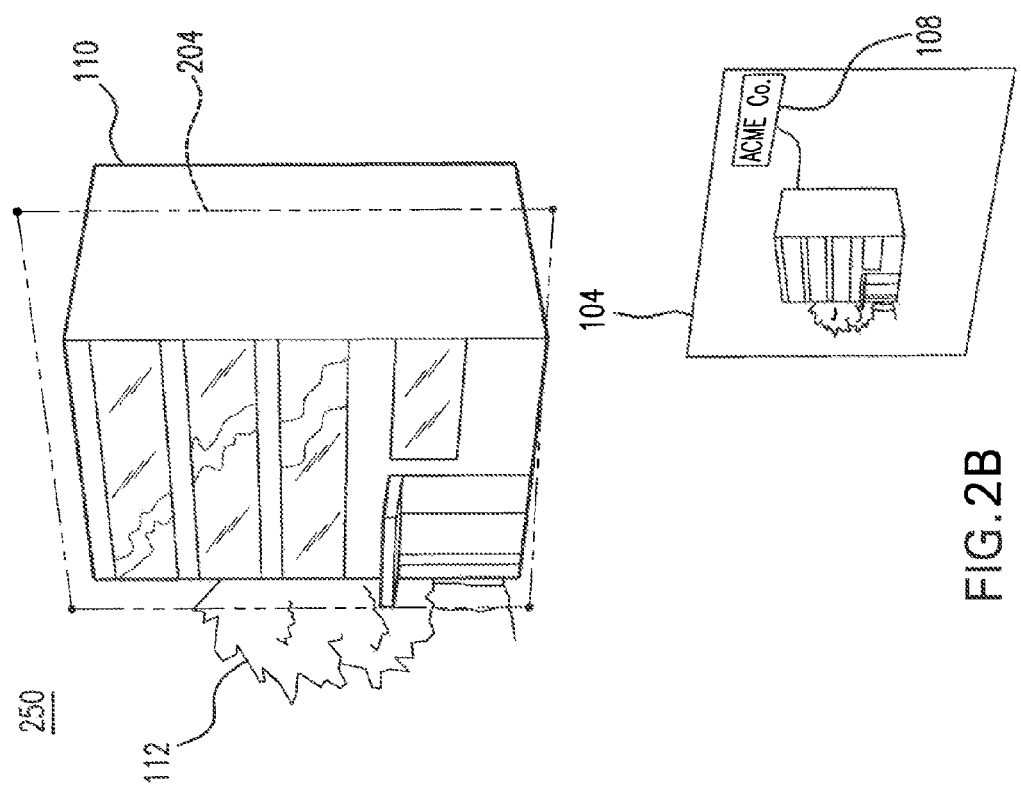
FIG. 2B is a diagram that illustrates displaying the annotation of FIG. 2A.

FIGS. 2A and 2B are diagrams that illustrate creating and displaying annotations according to the present invention in greater detail. FIG. 2A is a diagram that illustrates using image 102 to determine a location of an annotation created according to an embodiment of the present invention. FIG. 2B is a diagram that illustrates displaying the annotation after it is created.

Referring to FIG. 2A, an example 200 is illustrated that demonstrates using image 102 to determine a location for an annotation. As in example 100 (see FIG. 1), example 200 involves a tree 112 and a building 110. Example 200 also involves an image 102 taken of tree 112 and building 110.

As illustrated in FIG. 2, selecting object 122 is input by a user to select a portion of two-dimensional image 102. In the example shown, selecting object 122 is a rectangle or bounding box surrounding the portion of image 102 showing building 110. However, selecting object 122 may be any shape that selects a portion of image 102. In other examples, selecting object 122 may be, for example, a circle, a lasso, or a point.

From a camera viewpoint 202, selecting object 122 is projected onto a three-dimensional model 206. The projection 204 of selecting object 122 onto three-dimensional model 206 is used to determine in a location or location information for the annotation. In an embodiment, three-dimensional model 206 may include facade planes and street planes. An example of how three-dimensional model 206 is generated is discussed in detail below.

In the example shown in FIG. 2A, camera viewpoint 202 may be a focal point of a camera used to take image 102. The camera may have a focal length 208. Rays, such as ray 210, are determined using camera viewpoint 202 and selecting object 122. In an embodiment, each ray extends from focal point 202 through points of selecting object 122 to intersect with three-dimensional model 206. The intersection with three-dimensional model 206 is used to determine a location for the annotation. In embodiments, the determined location may be, for example, a location corresponding to the center of selecting object 122 or a location corresponding to a point on selecting object 122.

In an embodiment, the determined location for the annotation is a geometry in three-dimensional space corresponding to the projection 204 of selecting object 122 onto three-dimensional model 206. The geometry may, for example, be defined by a set of coordinates or a triangular mesh. As described herein, the location may be associated with text 106 or other content to form an annotation. This annotation may be stored in, for example, a database for retrieval and display with other images or a map.

FIG. 2B is a diagram that depicts an example 250 of displaying the annotation created in example 200 on another image such as, for example, image 104. Image 104 is an image showing building 110 and tree 112. The perspective of image 104 contains the location determined in example 200, and as such, image 104 can be said to correspond to the location. As a result, the content of the annotation created in example 200 is displayed at location 108 on image 104. In embodiments, the text of the annotation may be displayed in an informational balloon pointing to the portion of image 104 corresponding to the location information associated with the annotation. In an embodiment, the portion of image 104 corresponding to the location may be outlined or highlighted. In an embodiment, the annotation created in example 200 may be displayed on a map. These examples are strictly illustrative and are not intended to limit the present invention.

Figure 3:
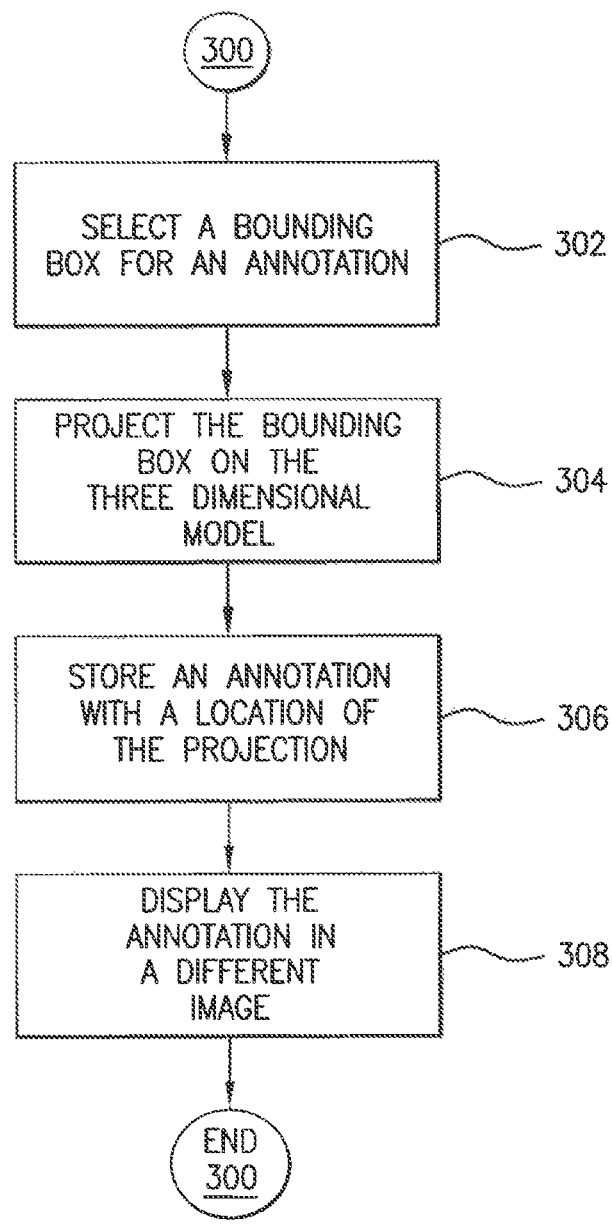
FIG. 3 is a flowchart that illustrates a method for creating and displaying annotations according to an embodiment of the present invention.

FIG. 3 is a flowchart that demonstrates a method 300 for creating and displaying annotations according to an embodiment of the invention. Method 300 begins at step 302.

In step 302, a user selects a bounding box (e.g., a selecting object) for creating an annotation. The bounding box may be used to select a portion of an image taken from street level. In an embodiment, the user may select a bounding box by drawing a perimeter of the bounding box in the image with an input device such as, for example, a mouse.

In step 304, the bounding box (selecting object) is projected onto a three-dimensional model. In an embodiment, the projection may be performed by extending rays from a camera viewpoint through the bounding box to the three-dimensional model and determining an intersection between the rays and the three-dimensional model. An example of this is described above with respect to FIG. 2A.

In step 306, a location corresponding to the projection performed in step 304 is stored together with content (e.g., an annotation) input by a user. As an example, in step 306, the annotation may be stored in a database. In embodiments, the content input by the user may include text, HTML, XML, images, video, or other multimedia content.

In step 308, the annotation stored in step 306 is displayed together with or on top of a second image corresponding to the location of the projection of step 304. As an example, the second image may be a street level panoramic image. In an embodiment, the annotation may be displayed together with or on top of a map.

FIG. 4 is a flowchart that demonstrates a method 400 for creating a three-dimensional model from image data according to an embodiment of the invention. Method 400 starts with step 402.

In step 402, features of images are identified. In an embodiment, the features are extracted from the images for subsequent comparison. This is described in more detail below with respect to FIGS. 5A-B. In one embodiment, the images that are used are street level panoramic images that are taken from nearby locations to one another along a route of travel.

In step 404, features in neighboring images are matched. In an embodiment, matching features may include constructing a spill tree. This is described in more detail below with respect to FIG. 5C.

In step 406, the locations of features are calculated, for example, as points in three-dimensional space. In an embodiment, points are determined by computing stereo triangulations using pairs of matching features as determined in step 404. How to calculate points in three-dimensional space is described in more detail below with respect to FIGS. 6-7. The result of step 406 is a cloud of points.

In step 408, facade planes are estimated based on the cloud of points calculated in step 406. In an embodiment, step 408 may comprise using an adaptive optimization algorithm or best fit algorithm. In one embodiment, step 408 comprises sweeping a plane, for example, that is aligned to a street as is described below with respect to FIG. 9.

In step 410, street planes are estimated based on the location of streets. These street planes together with the facade planes estimated in step 408 are used to form a three-dimensional model corresponding to objects shown in a plurality of two-dimensional images.

FIGS. 5A-C illustrate an example of how to identify and match features in images according to method 400.

FIG. 5A depicts an image 502 and an image 504. Image 502 and image 504 represent, for example, two photographs of the same building and tree from different perspectives. In an embodiment, image 502 and image 504 may be portions of street level panoramic images. The two images 502 and 504 may be taken from nearby locations, but with different perspectives.

In one embodiment, images 502 and 504 may be taken from a moving vehicle with a rosette of eight cameras attached. The eight cameras take eight images simultaneously from different perspectives. The eight images may be subsequently stitched together to form a panorama. Image 502 may be an unstitched image from a first camera in the eight camera rosette directed perpendicular to the vehicle. Image 504 may be an unstitched image from a second camera adjacent to the first camera taken during a later point in time.

FIG. 5B illustrates image 502 and image 504 with representative features identified/extracted according to step 404 of method 400. Image 502 includes representative features 506, 508, and 512. Image 504 includes representative features 510, 514, and 516. While only six representative features are shown, in practice there may be thousands of features identified and extracted for each image.

In an embodiment, the step of extracting features may include interest point detection and feature description. Interest point detection detects points in an image according to a condition and is preferably reproducible under image variations such as variations in brightness and perspective. The neighborhood of each interest point is a feature. Each feature is represented by a feature descriptor. The feature descriptor is preferably distinctive.

In an example, a Speeded Up Robust Features (SURF) algorithm is used to extract features from neighboring images. The SURF algorithm is described, for example, in Herbert Bay, Tinne Tuytelaars, Luc Van Gool, "SURF: Speeded Up Robust Features", Proceedings of the Ninth European Conference on Computer Vision, May 2006. The SURF algorithm includes an interest point detection and feature description scheme. In the SURF algorithm, each feature descriptor includes a vector. In one implementation, the vector may be 128-dimensional. In an example where the images are panoramas taken from street level, the SURF algorithm may extract four to five thousand features in each image, resulting in a feature descriptor file of one to two megabytes in size.

FIG. 5C illustrates extracted features being matched. FIG. 5C depicts a match 520 and match 522. Match 520 includes feature 512 and feature 514. Match 522 includes feature 506 and feature 516. As represented in FIG. 5C, not every feature in image 502 has a matching feature in image 504 and vice versa. For example, feature 508 in image 502 does not have a matching feature in image 504, because feature 508 shows a portion of a tree that is obscured in image 504. In another example, feature 510 in image 504 does not have a match in image 502, for example, because of an imprecision in the feature identification. The feature identification should be a precise as possible. However, due to variations in lighting, orientation, and other factors, some imprecision is likely. For this reason, a feature matching scheme is required that compensates for the imprecision. An example feature matching scheme is described below.

In an embodiment, each feature such as feature 512 is represented by a feature descriptor. Each feature descriptor includes a 128-dimensional vector. The similarity between a first feature and a second feature may be determined by finding the Euclidean distance between the vector of the first feature descriptor and the vector of the second feature descriptor.

A match for a feature in the first image among the features in the second image may be determined, for example, as follows. First, the nearest neighbor (e.g., in 128-dimensional space) of a feature in the first image is determined from among the features in the second image. Second, the second-nearest neighbor (e.g., in 128 dimensional-space) of the feature in the first image is determined from among the features in the second image. Third, a first distance between the feature in the first image and the nearest neighboring feature in the second image is determined, and a second distance between the feature in the first image and the second nearest neighboring feature in the second image is determined. Fourth, a feature similarity ratio is calculated by dividing the first distance by the second distance. If the feature similarity ratio is below a particular threshold, there is a match between the feature in the feature in the first image and its nearest neighbor in the second image.

If the feature similarity ratio is too low, not enough matches are determined. If the feature similarity ratio is too high, there are too many false matches. In an embodiment, the feature similarity ratio may be between 0.5 and 0.95 inclusive.

In an embodiment, the nearest neighbor and the second nearest neighbor may be determined by constructing a spill tree of the features in the second image. The spill tree closely approximates the nearest neighbors and efficiently uses processor resources. In an example where the images being compared are panoramic images taken from street level, there may be hundreds of pairs of matched features for each pair of images. For each pair of matched features, a point in three-dimensional space can be determined, for example, using stereo triangulation.

FIGS. 6 and 7 illustrate an example of determining a point in three-dimensional space based on matched features using three-dimensional stereo triangulation. In an embodiment, this technique is used, for example, to implement step 406 of method 400. To determine a point in three-dimensional space corresponding to a pair of matched features, rays are constructed for the pair of matched features and the point is determined based on the intersection of the rays. This is described in more detail below.

FIG. 6 shows an example 600 that illustrates how a ray is formed. As shown in FIG. 6, a ray 606 can be formed by projecting or extending a ray from a camera viewpoint 602 of image 608 through a feature 604 of image 608. In example 600, camera viewpoint 602 corresponds to the focal point of the camera used to take image 608. The distance between image 608 and camera viewpoint 602 is equal to focal length 610.

After a ray for each of the matching features is formed, a point in three-dimensional space may be determined. FIG. 7 illustrates an example 700 depicting how a point is determined.

In example 700, two camera rosettes 702 and 704 are shown. In an embodiment, these two camera rosettes can be the same (e.g., the same camera rosette can be used to take images at different locations and at different points in time). Each camera rosette 702 and 704 includes an image with a matched feature. In example 700, camera rosette 702 includes a feature 706 that is matched to a feature 708 of camera rosette 704. As shown in FIG. 7, a first ray 710 is formed by extending ray 710 from the camera viewpoint of camera rosette 702 through feature 706. Similarly, a second ray 712 is formed by extending ray 712 from the camera viewpoint of camera rosette 704 through feature 708. The intersection of ray 710 and ray 712 is a three-dimensional point 714. In embodiments, for example, due to imprecision in feature identification and matching, rays 710 and 712 may not actually intersect at a point 714. If rays 710 and 712 do not actually intersect, a line segment where the rays are closest can be determined. In these situations, the three-dimensional point 714 used may be the midpoint of the line segment.

In embodiments, as described above, the steps illustrated by examples 600 and 700 are repeated for each pair of matched features to determine a cloud of three-dimensional points.

FIG. 8A shows an example 800 of three-dimensional space that includes a building 806 and a tree 808. Example 800 also includes a street 810. In an embodiment, photographic images of building 806 and tree 808 may be taken from a vehicle moving along street 810. A first photographic image may be taken from a position 802, while a second photographic image may be taken from a position 804.

As described herein, in accordance with an embodiment of the present invention, features are extracted from the first and second images. Matching features are identified, and for each pair of matching features, a three-dimensional point is determined, for example, using a stereo triangulation. This results in a cloud of three-dimensional points, such as those illustrated in FIG. 8B. FIG. 8B illustrates an example 850 in which a cloud of three-dimensional points 852 are depicted.

FIGS. 9A-C illustrate an example of how to determine a facade surface based on a plurality of points in three-dimensional space. This example is merely illustrative and can be used, for example, to implement step 408 of method 400. In other embodiments, the surface may be determined using a best-fit or regression analysis algorithm such as, for example, a least-squares or an adaptive optimization algorithm. Examples of adaptive optimization algorithms include, but are not limited to, a hill-climbing algorithm, a stochastic hill-climbing algorithm, an A-star algorithm, and a genetic algorithm.

FIG. 9A depicts a street 908 and a cloud of three-dimensional points 910. Running parallel to street 908 is a facade plane 902. In operation, facade plane 902 is translated outward on an axis from street 908. At each position moving outward, the number of points within a particular range of facade plane 902 is evaluated. In FIG. 9A, the range is shown by dotted lines 912 and 914. As shown in FIG. 9A, zero points are located between dotted lines 912 and 914.

FIG. 9B shows a facade plane 904 translated outward on an axis from street 908. In FIG. 9B, facade plane 904 has been moved outward from street 908 a greater distance than that of facade plane 902 shown in FIG. 9A. As a result, three points are within the range from facade plane 904.

In an embodiment, if a position for a facade plane (e.g., a position having a specified number of nearby points) is not found, the angle of the facade plane may be varied relative to the street. Accordingly, FIG. 9C shows a facade plane 906 that is at a non-parallel angle with respect to street 908. As shown in FIG. 9C, there are five points that are close to facade plane 906.

As described herein, a three-dimensional model according to the present invention may also include one or more street planes (e.g., a plane parallel to the street). In an embodiment, a street plane may be calculated based on a known position of a street (e.g., one may know the position of the street relative to the camera used to take the images).

FIG. 10 shows a system 1000 for creating and displaying annotations according to an embodiment of the present invention. As shown in FIG. 10, system 1000 includes a client 1002. Client 1002 communicates with one or more servers 1024, for example, across network(s) 1034. Client 1002 may be a general-purpose computer. Alternatively, client 1002 can be a specialized computing device such as, for example, a mobile handset. Similarly, server(s) 1024 can be implemented using any computing device capable of serving data to client 1002.

Server(s) 1024 may include a web server. A web server is a software component that responds to a hypertext transfer protocol (HTTP) request with an HTTP reply. As illustrative examples, the web server may be, without limitation, an Apache HTTP Server, an Apache Tomcat, a Microsoft Internet Information Server, a JBoss Application Server, a WebLogic Application Server, or a Sun Java System Web Server. The web server may serve content such as hypertext markup language (HTML), extendable markup language (XML), documents, videos, images, multimedia features, or any combination thereof. This example is strictly illustrative and does not limit the present invention.

Server(s) 1024 may serve map tiles 1014, a program 1016, configuration information 1018, and/or panorama tiles 1020 as discussed below.

Network(s) 1034 can be any network or combination of networks that can carry data communication, and may be referred to herein as a computer network. A network 1034 can include, but is not limited to, a local area network, a medium area network, and/or a wide area network such as the Internet. Network(s) 1034 can support protocols and technology including, but not limited to, World Wide Web protocols and/or services. Intermediate web servers, gateways, or other servers may be provided between components of system 1000 depending upon a particular application or environment.

A server 1024 is coupled to a panorama database 1028, a model database 1030, and an annotation database 1032. Panorama database 1028 stores images. In an embodiment, the images may be photographic images taken from street level. The photographic images taken from the same location may be stitched together to form a panorama. Model database 1030 stores a three-dimensional model corresponding to the images in panorama database 1028. Annotation database 1032 stores user-generated annotations.

Each of panorama database 1028, model database 1030, and annotation database 1032 may be implemented on a relational database management system. Examples of relational databases include Oracle, Microsoft SQL Server, and MySQL. These examples are illustrative and are not intended to limit this invention.

A server 1024 may include an annotation generator 1026. Annotation generator 1026 projects a selecting object (e.g., a bounding box) onto the three-dimensional model in model database 1030. The selecting object may be input by a user along with content while viewing an image. The selecting object and the content may be received by server 1024 as annotation data 1022. Annotation generator 1026 determines a location corresponding to the projection on the three-dimensional model in model database 1030. The location is a geometry in three-dimensional space. The geometry may, for example, be defined by a set of coordinates or a triangular mesh.

Once a location is determined, annotation generator 1026 associates the location with content entered by the user. Annotation generator 1026 may then store the location and the content as an annotation in annotation database 1032.

In an embodiment, client 1002 may contain a mapping service 1006 and a panorama viewer 1008. Each of mapping service 1006 and panorama viewer 1008 may be a stand-alone application or may be executed within a browser 1004. In embodiments, browser 1004 may be Mozilla Firefox or Microsoft Internet Explorer. Panorama viewer 1008, for example, can be executed as a script within browser 1004, as a plug-in within browser 1004, or as a program which executes within a browser plug-in, such as the Adobe (Macromedia) Flash plug-in.

Mapping service 1006 displays a visual representation of a map, for example, as a viewport into a grid of map tiles. Mapping system 1006 is implemented using a combination of markup and scripting elements, for example, using HTML and Javascript. As the viewport is moved, mapping service 1006 requests additional map tiles 1014 from server(s) 1024, assuming the requested map tiles have not already been cached in local cache memory. Notably, the server(s) which serve map tiles 1014 can be the same or different server(s) from the server(s) which serve panorama tiles 1020, configuration information 1018 or the other data involved herein.

In an embodiment, mapping service 1006 can request that browser 1004 proceed to download a program 1016 for a panorama viewer 1008 from server(s) 1024 and to instantiate any plug-in necessary to run program 1016. Program 1016 may be a Flash file or some other form of executable content. Panorama viewer 1008 executes and operates according to program 1016.

Panorama viewer 1008 requests configuration information 1018 from server(s) 1024. The configuration information includes meta-information about a panorama to be loaded, including information on links within the panorama to other panoramas. In an embodiment, the configuration information is presented in a form such as the Extensible Markup Language (XML). Panorama viewer 1008 retrieves visual assets 1020 for the panorama, for example, in the form of panoramic images or in the form of panoramic image tiles. In another embodiment, the visual assets include the configuration information in the relevant file format. Panorama viewer 1008 presents a visual representation on the client display of the panorama and additional user interface elements, as generated from configuration information 1018 and visual assets 1020. As a user interacts with an input device to manipulate the visual representation of the panorama, panorama viewer 1008 updates the visual representation and proceeds to download additional configuration information and visual assets as needed.

Panorama viewer 1008 may include an annotation viewer 1010 and an annotation editor 1012. Annotation editor 1012 enables a user to enter a selecting object and content for an annotation. As an example, the user may enter a bounding box using an input device such as a mouse. The user may use the input device to select a portion of the panoramic image displayed by panorama viewer 1008. The content the user may enter may include text, HTML, XML, images, video, or other multimedia content.

Once the user enters a selecting object (e.g., a bounding box) and content, annotation editor 1012 transmits that information to server 1000 as annotation data 1022. As an example, annotation data 1022 may be packaged in an (Hypertext Transfer Protocol) HTTP request as HTTP parameters. Alternatively, annotation data 1022 may be encoded in XML.

Annotation viewer 1010 displays annotations to the user. In an embodiment, each annotation with a location close to the panorama may display in panorama viewer 1008. In that embodiment, configuration information 1018 may include the content of each annotation and the location within the panorama of each annotation. In an illustrative example, annotation viewer 1010 may outline the region of the panorama including the location of the annotation and may display the content of the annotation in an informational balloon.

Each of browser 1004, mapping service 1006, panorama viewer 1008, annotation viewer 1010, and annotation editor 1012 may be implemented in hardware, software, firmware or any combination thereof.

FIG. 11 shows an example browser interface 1100 for system 1000. Example browser interface 1100 is strictly illustrative, and other interfaces may be used. Browser interface 1100 may be rendered by browser 1004 (see FIG. 10). Browser interface 1100 includes a map interface 1104 and a panorama viewport 1102. Map interface 1104 may be rendered by mapping service 1006, and panorama viewport 1102 may be rendered by panorama viewer 1008.

Panorama viewport 1102 shows an annotation being created by a user. Panorama viewport 1102 includes a selecting object (e.g., bounding box) 1106, a text field 1112 and a submit button 1110. In this example, to enter an annotation the user may select a portion of the panoramic image as shown by selecting object 1106. The user may enter text into text field 1112. Once the user creates selecting object 1106 and enters content into text field 1112, the user may select submit button 1102. Selecting submit button 1102 causes the location of selecting object 1106 and the content in text field 1112 to be sent to server 1024 as annotation data 1022 (see FIG. 10). Server 1024 then determines the location of the annotation and stores the annotation. Again, this example is merely illustrative and is not meant to limit the invention. Other interfaces may be used as is apparent to those skilled in the art.

Panorama viewport 1102 also displays an annotation previously stored by a user. Panorama viewport 1102 includes an outline 1114. Outline 1114 is optional and shows the location of the annotation within the panorama. Panorama viewport 1102 also includes an informational balloon 1108 that displays the text of the annotation. In an embodiment, the text of the annotation and the location of the annotation within the panorama are a part of configuration information 1018 (see FIG. 10).

FIG. 12 shows a system 1200 for creating a three-dimensional model from image data according to an embodiment of the invention. System 1200 includes panorama database 1028 and model database 1030 each coupled to a processing pipeline server 1224. Processing pipeline server 1224 may be any computing device. Example computing devices include, but are not limited to, a computer, a workstation, a distributed computing system, an embedded system, a stand-alone electronic device, a networked device, a mobile device, a rack server, a television, or other type of computing system.

Processing pipeline server 1224 includes a feature extractor 1216, a feature matcher 1218, a point calculator 1220, and a surface estimator 1222. Each of feature extractor 1216, feature matcher 1218, point calculator 1220, and surface estimator 1222 may be implemented in hardware, software, firmware or any combination thereof.

Feature extractor 1216 selects images 1202 from panorama database 1028. In an embodiment, images 1202 may include two images which are street level unstitched panoramic images. The two images may be taken from nearby location to one another, but from different perspectives. In an embodiment, the images are taken from a moving vehicle with a rosette of eight cameras attached. The eight cameras take eight images simultaneously from different perspectives. The eight images may be subsequently stitched together to form a panorama. The first image may be an unstitched image from a first camera in the eight camera rosette. The second image may be an unstitched image from a second camera adjacent to the first camera taken during a later point in time.

Feature extractor 1216 extracts features from images 1202. In an embodiment, feature extractor 1216 may perform more than one function such as, for example, interest point detection and feature description. Interest point detection detects points in an image according to conditions and is preferably reproducible under image variations such as variations in brightness and perspective. The neighborhood of each interest point is then described as a feature. These features are represented by feature descriptors. The feature descriptors are preferably distinctive.

In an example, a Speeded Up Robust Features (SURF) algorithm may be used to extract features from the images. The SURF algorithm includes an interest point detection and feature description scheme. In the SURF algorithm, each feature descriptor includes a vector. In one implementation, the vector may be 128-dimensional. In an example where the images are panoramas taken from street level, the SURF algorithm may extract four to five thousand features in each image, resulting in a feature descriptor file 1204 of one to two megabytes in size.

Feature matcher 1218 uses each feature descriptor file 1204 to match features in the two images. In an example, each feature is represented by a feature descriptor in feature descriptor file 1204. Each feature descriptor includes a 128-dimensional vector. The similarity between a first feature and a second feature may be determined by finding the Euclidean distance between the vector of the first feature and the vector of the second feature.

A match for a feature in the first image among the features in the second image may be determined as follows. First, feature matcher 1218 determines the nearest neighbor (e.g., in 128-dimensional space) of the feature in the first image determined from among the features in the second image. Second, feature matcher 1218 determines the second-nearest neighbor of the feature in the first image determined from among the features in the second image. Third, feature matcher 1218 determines a first distance between the feature in the first image and the nearest neighboring feature in the second image, and feature matcher 1218 determines a second distance between the feature in the first image and the second nearest neighboring feature in the second image. Fourth, feature matcher 1218 calculates a feature similarity ratio by dividing the first distance by the second distance. If the feature similarity ratio is below a particular threshold, there is a match between the feature in the first image and its nearest neighbor in the second image.

Feature matcher 1218 may determine the nearest neighbor and second nearest neighbor, for example, by constructing a spill tree.

If the feature similarity ratio is too low, feature matcher 1218 may not determine enough matches. If the feature similarity ratio is too high, feature matcher 1218 may determine too many false matches. In an embodiment, the feature similarity ratio may be between 0.5 and 0.95 inclusive. In examples where the images are panoramas taken from street level, there may be several hundred matched features. The matched features are sent to point calculator 1220 as matched features 1206.

Point calculator 1220 determines a point in three-dimensional space for each pair of matched features 1206. To determine a point in three-dimensional space, a ray is formed or determined for each feature, and the point is determined based on the intersection of the rays for the features. In an embodiment, if the rays do not intersect, the point is determined based on the midpoint of the shortest line segment connecting the two rays. The output of point calculator 1220 is a cloud of three-dimensional points 1208 (e.g., one point for each pair of matched features).

Surface estimator 1222 determines a facade plane based on the cloud of points 1208. Surface estimator 1222 may determine the facade plane by using a best-fit or regression analysis algorithm such as, for example, a least-squares or an adaptive optimization algorithm. Examples of adaptive optimization algorithms include, but are not limited to, a hill-climbing algorithm, a stochastic hill-climbing algorithm, an A-star algorithm, and a genetic algorithm. Alternatively, surface estimator 1222 may determine the facade surface by translating a plane to determine the best position of the plane along an axis, as described above with respect to FIGS. 9A-C.

Surface estimator 1222 may also determine more or more street planes. The street planes and the facade planes together form surface planes 1210. Surface estimator 1222 stores surface planes 1210 in model database 1030.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. Furthermore, while the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The invention claimed is:

1. A method, comprising:
identifying, by one or more computing devices, a plurality of features in one or more two-dimensional images;
matching, by the one or more computing devices, at least some of the plurality of features of the one or more two-dimensional images with features of one or more neighboring two-dimensional images;
calculating, by the one or more computing devices, a location for each of the matched features, the calculating resulting in a cloud of points in three-dimensional space;
estimating, by the one or more computing devices, at least one facade plane based on the cloud of points;
estimating, by the one or more computing devices, at least one street plane based on a location of a street, the street being associated with given ones of the one or more two-dimensional images; and
forming, by the one or more computing devices, a three-dimensional model from the at least one estimated facade plane and the at least one estimated street plane, the three-dimensional model corresponding to one or more objects shown in the two-dimensional images;
wherein estimating the at least one facade plane includes translating the at least one facade plane on an axis from the street and evaluating how many points of the cloud of points are within a predetermined range of the one or more facade planes at each of a plurality of stages of the translation.

2. The method of claim 1, wherein the at least one estimated facade plane and the at least one estimated street plane together form at least one surface.

3. The method of claim 1, further comprising varying an angle of each facade plane relative to the street.

4. The method of claim 1, wherein estimating the at least one street plane is based on the location of the street relative to a camera used to capture selected ones of the one or more two-dimensional images.

5. The method of claim 1, further comprising:
projecting a bounding box onto the three-dimensional model;
identifying a location corresponding to the projected bounding box; and
generating a display of an annotation associated with the identified location.

6. The method of claim 5, wherein the display is generated so that the annotation is displayable together with or on top of a selected image corresponding to the identified location.

7. A system, comprising one or more computing devices configured to:
identify a plurality of features in one or more two-dimensional images;
match at least some of the plurality of features of the one or more two-dimensional images with features of one or more neighboring two-dimensional images;
calculate a location for each of the matched features, the calculation resulting in a cloud of points in three-dimensional space;
estimate at least one facade plane based on the cloud of points;
estimate at least one street plane based on a location of a street, the street being associated with given ones of the one or more two-dimensional images; and
form a three-dimensional model from the at least one estimated facade plane and the at least one estimated street plane, the three-dimensional model corresponding to one or more objects shown in the two-dimensional images, the three-dimensional model being stored in a model database;
wherein estimating the at least one facade plane includes translating the at least one facade plane on an axis from the street and evaluating how many points of the cloud of points are within a predetermined range of the one or more facade planes at each of a plurality of stages of the translation.

8. The system of claim 7, wherein the one or more computing devices are further configured to vary an angle of each facade plane relative to the street.

9. The system of claim 7, wherein estimating the at least one street plane is based on the location of the street relative to a camera used to capture selected ones of the one or more two-dimensional images.

10. The system of claim 7, wherein the one or more computing devices are further configured to:
project a bounding box onto the three-dimensional model;
identify a location corresponding to the projected bounding box; and
generate a display of an annotation associated with the identified location.

11. The system of claim 10, wherein the display is generated so that the annotation is displayable together with or on top of a selected image corresponding to the identified location.

12. A non-transitory computer-readable storage medium on which computer readable instructions of a program are stored, the instructions, when executed by one or more computing devices, cause the one or more computing devices to perform a method comprising:
identifying a plurality of features in one or more two-dimensional images;
matching at least some of the plurality of features of the one or more two-dimensional images with features of one or more neighboring two-dimensional images;
calculating a location for each of the matched features, the calculating resulting in a cloud of points in three-dimensional space;
estimating at least one facade plane based on the cloud of points;
estimating at least one street plane based on a location of a street, the street being associated with given ones of the one or more two-dimensional images; and
forming a three-dimensional model from the at least one estimated facade plane and the at least one estimated street plane, the three-dimensional model corresponding to one or more objects shown in the two-dimensional images;
wherein estimating the at least one facade plane includes translating the at least one facade plane on an axis from the street and evaluating how many points of the cloud of points are within a predetermined range of the one or more facade planes at each of a plurality of stages of the translation.

13. The non-transitory computer-readable storage medium of claim 12, wherein the method further comprises:
projecting a bounding box onto the three-dimensional model;
identifying a location corresponding to the projected bounding box; and
generating a display of an annotation associated with the identified location.

14. The non-transitory computer-readable storage medium of claim 13, wherein the display is generated so that the annotation is displayable together with or on top of a selected image corresponding to the identified location.

15. The non-transitory computer-readable storage medium of claim 12, wherein the method further comprises varying an angle of each facade plane relative to the street.

16. The non-transitory computer-readable storage medium of claim 12, wherein estimating the at least one street plane is based on the location of the street relative to a camera used to capture selected ones of the one or more two-dimensional images.

* * * * *